United States Patent [19]

Walton

[11] Patent Number: 4,658,254

[45] Date of Patent: Apr. 14, 1987

[54] GAUGING APPARATUS

[75] Inventor: Hyman Walton, Berkermet, England

[73] Assignee: United Kingdom Atomic Energy Authority, London, England

[21] Appl. No.: 640,105

[22] Filed: Aug. 13, 1984

[30] Foreign Application Priority Data

Aug. 16, 1983 [GB] United Kingdom ............... 8322002

[51] Int. Cl.⁴ ................. G01R 17/02; G01B 7/14; G01B 7/28

[52] U.S. Cl. ................. 340/870.37; 73/304 C; 324/61 P; 324/61 R

[58] Field of Search .......... 324/60 R, 61 R, 61 P, 324/57 R; 340/870.37; 73/304 C

[56] References Cited

U.S. PATENT DOCUMENTS

| | | |
|---|---|---|
| 2,630,632 | 3/1953 | Brandon . |
| 2,892,152 | 6/1959 | Buisson ............... 324/61 P |
| 3,377,861 | 4/1968 | Thaler ............... 73/304 C |
| 3,452,743 | 7/1969 | Rieke ............... 324/61 P |
| 3,500,185 | 3/1970 | Eppler ............... 324/61 R |
| 3,742,347 | 6/1973 | Walton ............... 324/61 R |
| 3,827,300 | 8/1974 | Thaler ............... 324/61 R |
| 4,086,528 | 4/1978 | Walton ............... 324/61 R |

FOREIGN PATENT DOCUMENTS

| | | |
|---|---|---|
| 0067643 | 12/1982 | European Pat. Off. . |
| 1490389 | 5/1969 | Fed. Rep. of Germany .... 324/61 R |
| 1260579 | 4/1961 | France . |
| 2161109 | 7/1973 | France . |
| 2491205 | 4/1982 | France . |
| 0872855 | 7/1961 | United Kingdom . |
| 0880184 | 10/1961 | United Kingdom . |
| 1340703 | 12/1973 | United Kingdom . |
| 1414884 | 11/1975 | United Kingdom . |
| 1419779 | 12/1975 | United Kingdom . |
| 1517364 | 7/1978 | United Kingdom . |
| 2100441 | 12/1984 | United Kingdom . |

Primary Examiner—Reinhard J. Eisenzopf
Assistant Examiner—Jose M. Solis
Attorney, Agent, or Firm—William R. Hinds

[57] ABSTRACT

Apparatus for gauging physical dimensions of solid or tubular bodies. Apparatus comprises a capacitive transducer having electrodes forming diametrically arranged pairs of capacitors and means for connecting the pairs, preferably sequentially, in an arm of a four arm electrical network. For circumferential scanning of a solid body along its length, the body is moved along a path of travel through a head assembly including the transducer with the axis of the body being coincident with the axis of the transducer. As the body moves through the transducer the diametrically arranged pairs of capacitors scan the surface to result in a surface profile of the body. For scanning the bore of a pipe or tube the transducer is inserted as a probe and moved along the bore of the pipe or tube, means being provided for maintaining the probe coaxial with the pipe or tube.

3 Claims, 9 Drawing Figures

GAUGING APPARATUS

The present invention concerns gauging apparatus, and in particular apparatus for gauging physical dimensions of bodies such as pellets and tubes or pipes.

BACKGROUND OF THE INVENTION

An apparatus for detecting the size and shape of right cylindrical pellets as used in nuclear fuel pins is disclosed in our British Patent Specification No. 2,027,903. In this existing apparatus the pellets are allowed to roll down an inclined plane between capacitor plates extending the length of travel of the pellets and disposed obliquely to the path of travel such that the electric field between the plates intersects a pellet rolling down the inclined plane at different points along its axis of rotation. Means are provided for detecting changes in dielectric constant of the capacitor caused by movement of the pellets rolling down the inclined plane and for comparing such changes with changes in dielectric constant produced by a reference body of known size and shape whereby to obtain information concerning the size and shape of the pellets. Conveniently, the capacitor plates are formed by parallel wires. Whilst the existing apparatus provides an accurate and reliable measurement it is observed that dust and other foreign bodies on the inclined plane can interfere with the correct rolling of the pellets and furthermore badly deformed pellets can fail to roll down the plane in the required manner.

In the above existing apparatus a complete circumferential scan of the pellets is achieved by the rolling of the pellets between the capacitor plates. To avoid the disadvantages referred to above when rolling pellets down an inclined plane it was decided to reverse the arrangement to obtain the same effect by moving the pellets individually and axially between a capacitor head having a plurality of pairs of plates disposed circumferentially about the path of travel and providing means for scanning the plate pairs in sequence electronically. In other words, the field is now rotated about the pellets to obtain information concerning the dimensions and shapes of the pellets.

Reference will now be made to our British Patent Specification Nos. 1,340,703 and 1,517,364 which disclose apparatus for measuring a physical parameter, such as the diameter of a fuel pellet, by means of a capacitive transducer. The transducer comprises two capacitors which are connected in a four terminal electrical network having four arms and two charge amplifiers the input impedances of which form two arms of the network. The two capacitors are disposed at diametrically opposed positions about a pellet.

The present invention is an extension of the arrangement disclosed in Patent Specification Nos. 1,340,703 and 1,517,364 whereby to obtain circumferential scanning along the complete length of an object, such as a pellet or the bore of a tube.

FEATURES AND ASPECTS OF THE INVENTION

According to the present invention, apparatus for gauging physical dimensions of objects comprises a four arm electrical network, a capacitive transducer and a reference capacitor respectively forming two arms of the network, two charge amplifiers forming the other two arms of the network, means for applying an alternating current carrier input signal to the transducer and the reference capacitor, means for obtaining a signal dependent on the difference between the outputs of the charge amplifiers, means for demodulating the dependent signal to give an output representative of a change in a dimension of an object being gauged, the improvement wherein the transducer comprises a circular array of angularly spaced electrodes forming diametrically arranged pairs of capacitors, means for switching said pairs sequentially in the capacitive transducer arm of the network, means for positioning the transducer coaxially with the object for relative axial displacement therebetween, and means for effecting relative axial displacement therebetween whereby simultaneous application of the switching means and the displacement means results in a profiled scan of the object, said last mentioned means including means for positioning and moving objects through the transducer, said positioning and moving means comprising a pair of plungers adapted to releasably hold an object between the ends thereof.

At least one of the plungers may additionally constitute a calibration standard.

Also according to the invention, apparatus for gauging physical dimensions of objects comprises a four arm electrical net work, a capacitive transducer and a reference capacitor respectively forming two arms of the network, two charge amplifiers forming the other two arms of the network, means for applying an alternating current carrier input signal to the transducer and the reference capacitor, means for obtaining a signal dependent on the difference between the outputs of the charge amplifiers, means for demodulating the dependent signal to give an output representative of a change in a dimension of an object being gauged, the improvement wherein the transducer comprises a circular array of angularly spaced electrodes forming diametrically arranged pairs of capacitors, means for switching said pairs sequentially in the capacitive transducer arm of the net work, means for positioning the transducer coaxially with the object for relative axial displacement therebetween, and means for effecting relative axial displacement therebetween whereby simultaneous application of the switching means and the displacement means results in a profiled scan of the object, said transducer comprising a probe insertable within a bore of a tube and having means for centering the transducer within the bore, said centering means comprising lantern shaped members resiliently urged radially outwards to maintain sliding engagement with the bore of the tube.

DESCRIPTION OF THE DRAWINGS

The invention will be described further, by way of example, with reference to the accompanying drawings, in which.

DESCRIPTION OF THE PREFERRED EMBODIMENTS

Figure 1:
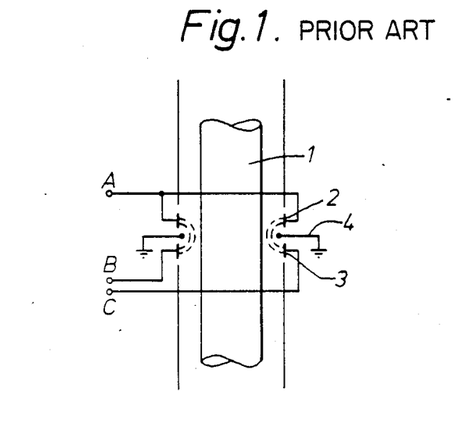
FIG. 1 is a diagram of a capacitive transducer comprising a pair of plates separated by an earth screen.

A capacitive transducer as shown in FIG. 1 comprises two variable capacitances disposed diametrically opposite to one another so as to determine the external diameter of an object, such as a nuclear fuel pellet 1. Each variable capacitance comprises plates 2 and 3 separated by an earth screen 4. The plates 2 are connected to a common terminal A and supplied with an alternating current carrier signal. The plates 3 are connected to respective terminals B and C. The capacitances of each of the variable capacitances is a function of the diameter of the pellet 1 disposed therebetween and as described in British Patent Specification No. 1,340,703.

Figure 2:
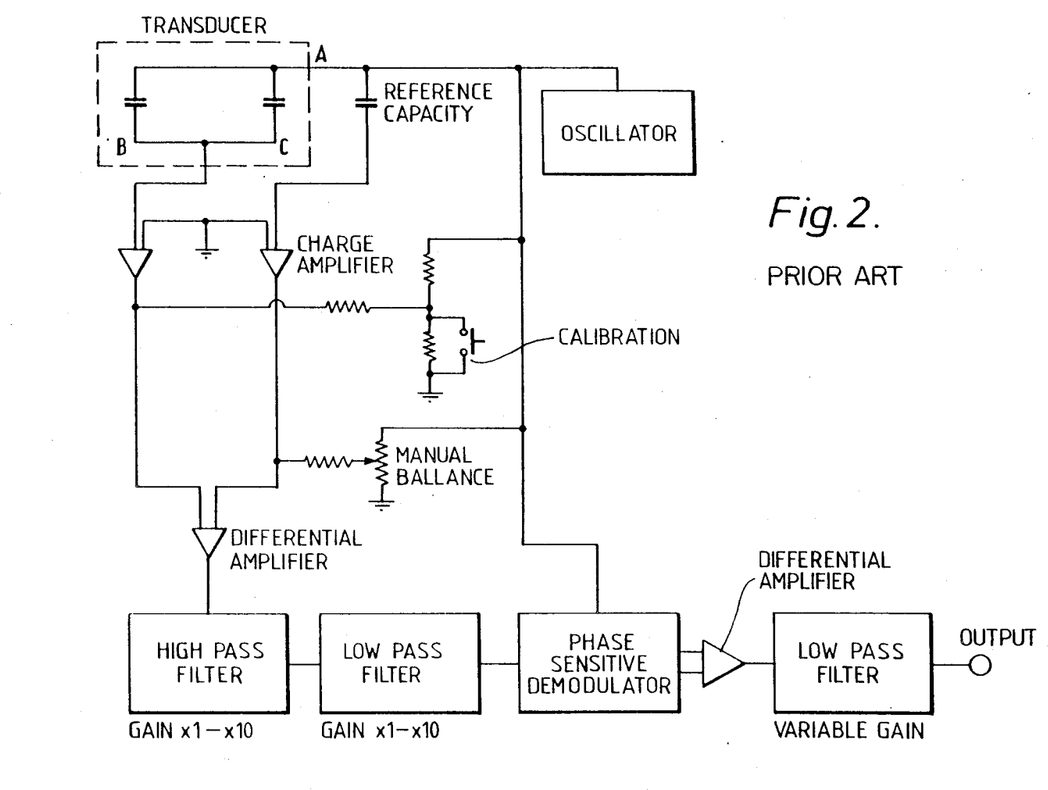
FIG. 2 is a diagram of a circuit incorporating the transducer for measurement of diameter.

The circuit diagram of FIG. 2 is similar to that disclosed in British Patent Specification No. 1,517,364. The transducer arrangement of FIG. 1 forms the portion of the circuit within the dotted outline. The transducer is connected in one arm of a four terminal network and a reference capacitor of constant capacitor is connected in another arm of the network. The above two arms are connected to respective charge amplifiers which comprise the remaining two arms of the network. The outputs from the charge amplifiers are connected to a differential amplifier and the output signal from the differential amplifier is amplified and demodulated in a manner identical to that in Patent Specification No. 1,517,364.

The variable capacitors of the transducer are connected in parallel to obtain a sum of their capacitances as an output from the transducer. The reference capacitor is chosen to represent a nominal value of the diameter of the pellet to be measured. A standard pellet or other means of known diameter can be passed through the transducer for initial calibration.

In operation of the circuit of FIG. 2 and to measure the diameter of a pellet, an oscillator can supply the reference capacitor and the transducer arrangement with a 20 KHz alternating current carrier signal. The plates of the capacitors in the transducer each have a direct capacitance to the earthed pellet and a leakage capacitance to the acceptor plates of the transducer. The outputs from the transducer arrangement and the reference capacitor are fed to the charge amplifiers and the output from the differential amplifier, which receives the outputs from the charge amplifiers, is a measure of the rod or bore of the tube after amplification and demodulation.

The above arrangement is capable of measuring an individual diameter but cannot perform a circumferential scan along the length of the pellet in order to gauge the surface quality of the pellet. This can be achieved by the transducer arrangement shown in FIGS. 3a and 3b and when used in the apparatus of FIGS. 5, 6 and 7.

Figure 3A:
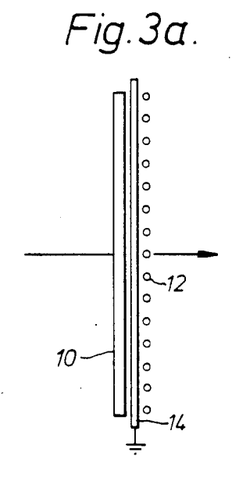
FIGS. 3a and 3b are respectively diagrammatic side and end views of a transducer for use in the apparatus of the present invention.
Figure 3B:
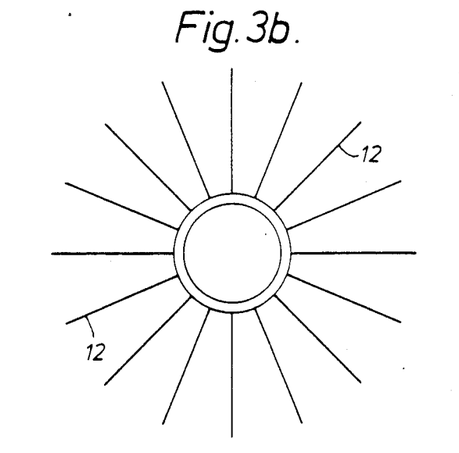
Figure 4:
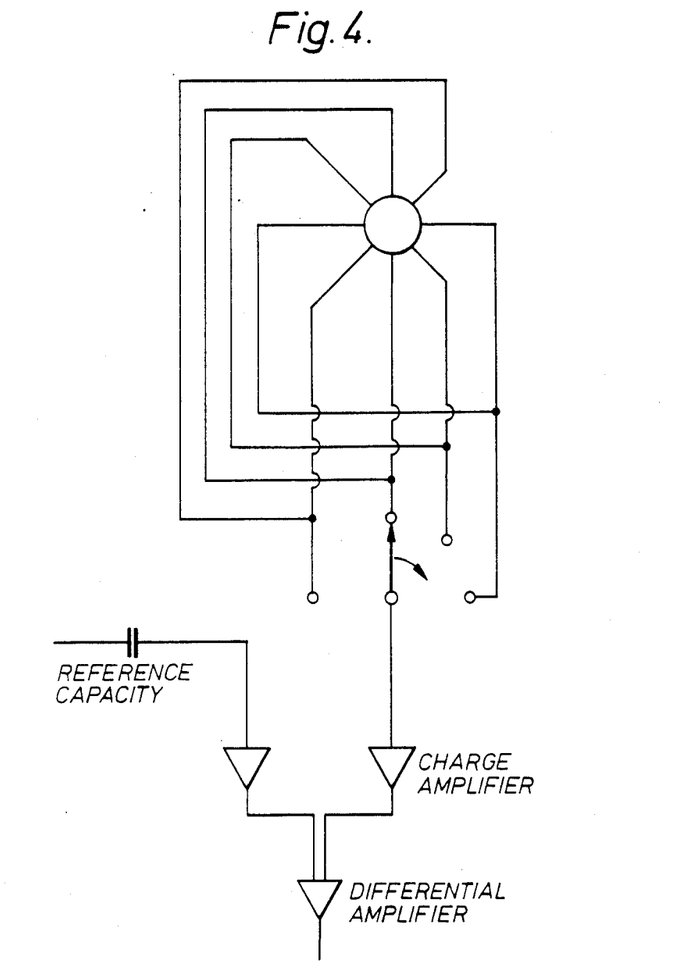
FIG. 4 is a schematic arrangement of a switching system for sequentially connecting pairs of diametrically opposed transducers to a charge amplifier.

With reference to FIGS. 3a and 3b, the transducer comprises an oscillator plate 10, in the form of an annular plate, and a ring of radially extending individual wires 12 located in a common plane and co-axial with the plate 10. An annular earth screen 14 is located between the wires 12 and the plate 10. The plate 10 corresponds to the plates 2 in FIG. 1 and is supplied with an alternating current carrier signal. Pairs of diametrically opposed wires 12 correspond to the plates 3 in FIG. 1 and are connected through a switching device to the appropriate charge amplifier. FIG. 4 depicts a possible switching arrangement and connections between the wires 12 and the charge amplifier. The diametrically opposed pairs of wires can be scanned in sequence as a pellet to be gauged is moved axially at a constant speed through the transducer to thereby obtain a surface profile of the pellet. The electrodes 12 can conveniently be enamelled copper wires.

Figure 5:
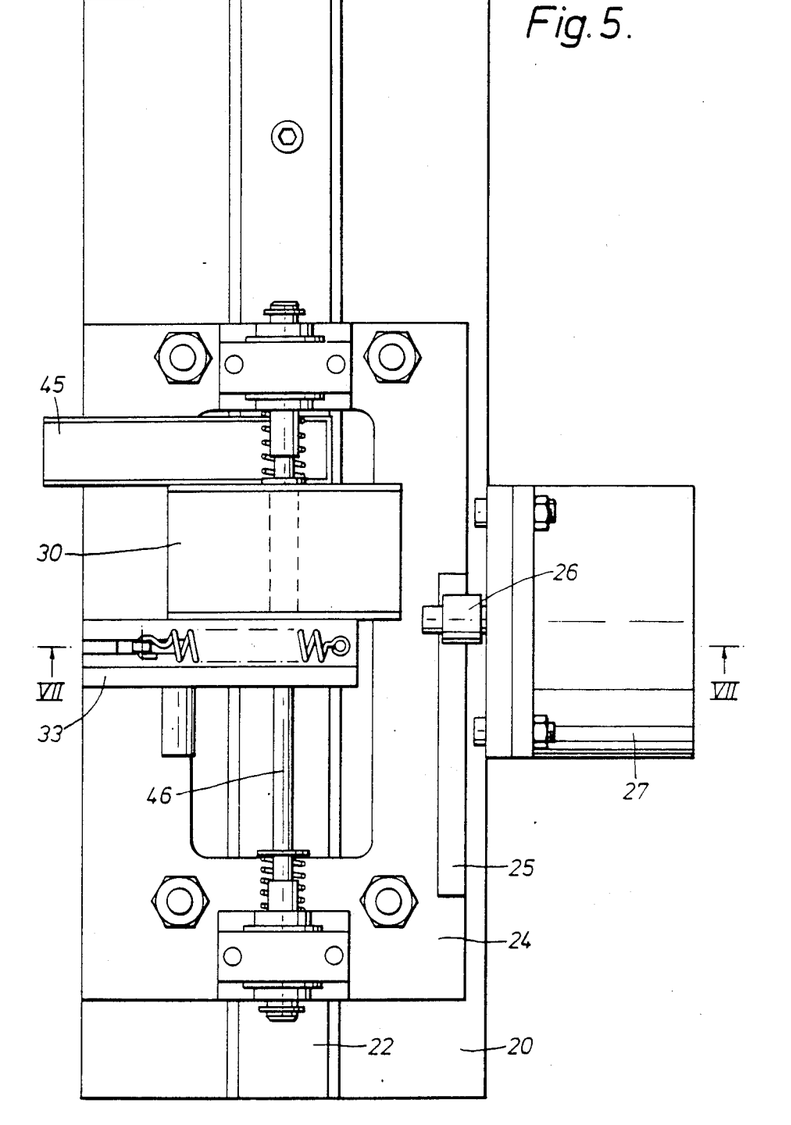
FIG. 5 is diagrammatic plan of a first embodiment of an apparatus for gauging objects.
Figure 6:
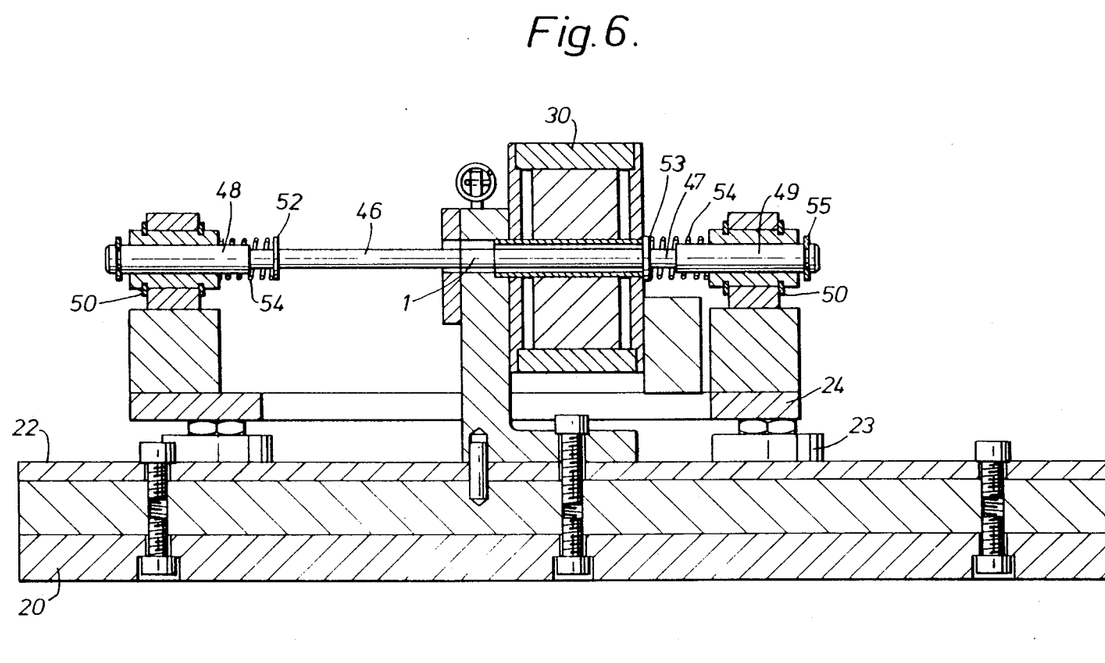
FIG. 6 is a diagrammatic longitudinal section of the apparatus in FIG. 5.
Figure 7:
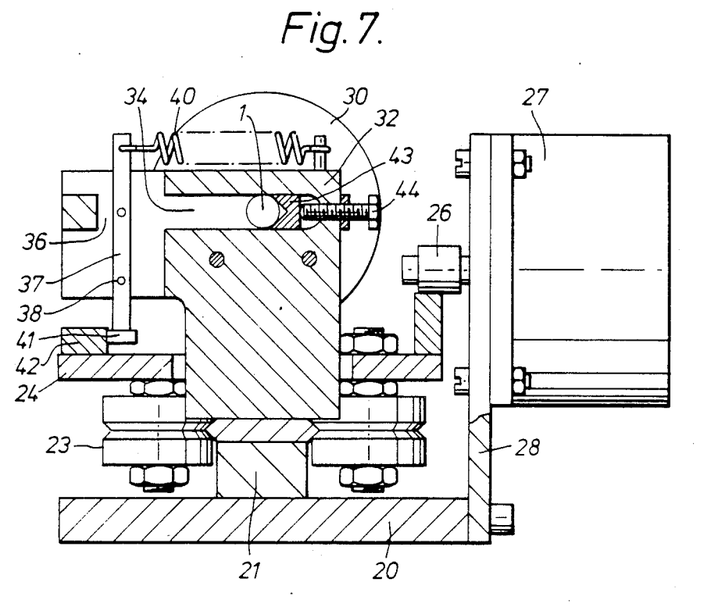
FIG. 7 is a section of VII—VII in FIG. 5.

FIGS. 5, 6 and 7 depict schematically an apparatus for feeding pellets sequentially through a transducer of the kind described above.

A base 20 carries a central support 21 which extends between the ends of the base. The support 21 carries a slide plate 22 which cooperates with roller journal assemblies 23 secured to and positioned beneath a carrier plate 24. A rack 25 at one side edge of the carrier plate 24 cooperates with a pinion 26 driven by a stepping motor 27, the latter being mounted on the base 20 by means of a support 28. Consequently, operation of the stepping motor effects to and fro travel of the carrier plate 24 over the base 20.

A head assembly 30 including the transducer is mounted on the base 20, the support for the head extending through an elongate opening in the carrier plate 24. An arrangement for introducing and positioning pellets in alignment with the bore through the head assembly is mounted at one end of the head assembly. This arrangement includes a block 32 having an outer cover plate 33. A slot 34 in the block receives pellets 1. Pellets introduced into the slot through a chute 35 in the plate 33 are urged continuously towards the blind end of the slot by means of a pusher 36 slidable in the slot and mounted on a lever 37 urged to pivot about axis 38 by a spring 40 connected to one end of the lever 37. The opposite end of the lever carries a roller 41 which cooperates with a cam track 42 on the carrier plate 24. An alignment anvil 43 in the form of a block having a V groove to receive pellets is located at the blind end of the slot, the position of the anvil being adjustable by means of a screw 44. The anvil is positioned such that with a pellet held in the V groove the axis of the pellet coincides with the axis of the bore through the head assembly. The anvil is removable and interchangeable, the size and angle of the V groove being determined by the pellets to be measured.

A discharge chute 45 is arranged at the opposite end of the head assembly to receive pellets which have passed through the assembly.

The pellets are pushed through the head assembly from the anvil to the discharge chute by means of a pair of aligned plungers 46, 47 which are telescopically slidable in respective cylinders 48, 49 slidably journalled in supports 50 at opposite ends of the carrier plate 24. Each plunger carries a respective fixed stop member 52, 53. In FIG. 6, the plungers are shown at a position to grip a pellet 1 about to be pushed through the head assembly. In this position the stop 53 on the right hand plunger 47 abuts against the discharge chute and the stop is located and positioned on the plunger such that the free end of the plunger 47 cannot enter and obstruct the slot 34 in the pellet feed block 32. Likewise the stop 52 on the left hand plunger and which cooperates with the cover plate at the pellet feed block is located and positioned such that the free end of the plunger 46 cannot extend into the discharge chute 45. Springs 54 continuously urge the ends of the plungers into positive engagement with the ends of the pellet to grip and carry the pellet through the head assembly. On arrival of the pellet at the discharge chute the carrier plate continues movement to the right with the support in contact with a further fixed stop 55 at the end of the cylinder 49. This movement allows the pellet to fall into the discharge chute. On the return movement of the carrier plate the ends of the plungers move back to the pellet receiving station. During this time interval the result of the scan performed on the pellet during its passage through the head can be analysed by computer means. Such a computer means can be linked to operate a gate in the pellet discharge path along the chute 45 whereby to separate pellets which do not fall within acceptable tolerance levels as determined by a standard used for initial calibration. An alternative to employing a standard pellet of known diameter for calibration is to utilise the plungers as the standard. Thus the plunger 46 can be accurately machined to a diameter conforming to a standard and as this plunger is itself scanned during passage through the transducer it can be used for calibration. Further, the result of the scan can be used to control equipment used for shaping the pellets, whereby any variations in pellet shape and profile are compensated automatically during manufacture.

In addition to gauging the cylindrical surface of pellets the head can also gauge the ends of the pellets to ensure that the ends are normal to the longitudinal axis of the pellet.

The apparatus is arranged to function automatically and continuously by transporting pellets individually and at discrete intervals through the head assembly containing the capacitive transducer.

Figure 8:
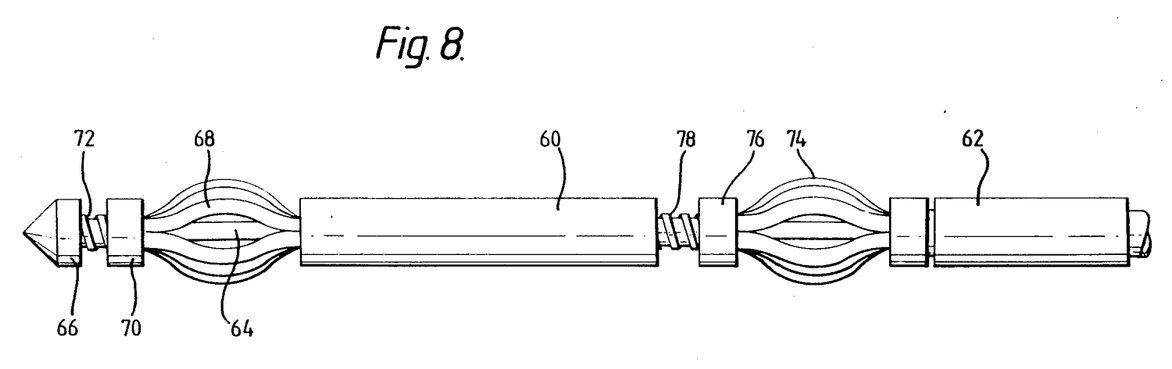
FIG. 8 is a schematic view of a second embodiment of a gauging apparatus.

FIG. 8 shows an apparatus for gauging bores of pipes and tubes. The apparatus comprises a transducer assembly 60 and a junction box 62 mounted on a spindle 64 which extends beyond the transducer assembly 60 and terminates in a head 66. A compressible and extendable petal or lantern shaped member 68 is secured to one end of the transducer assembly 60 and extends about the spindle 64 to a bush 70 slidable on the spindle. A spring 72 about the spindle and located between the head 66 and the bush 70 urges the latter in a direction towards the transducer assembly 60 to thereby expand the member 68. A similar member 74 is arranged between the junction box 62 and a further bush 76 slidable on the spindle. The bush 76 is urged towards the junction box 62 to expand the member 74 by means of a spring 78 disposed about the spindle between the transducer assembly 60 and the bush 76.

The transducer assembly 60 comprises, as before, an oscillator plate and a ring of radial scanning electrodes with an earth screen between the plate and electrodes. The transducer assembly can also include a pair of mutually perpendicular electrodes also separated from the oscillator plate by an earth screen. The cable connections to the various electrodes extend from the junction box through the spindle 64.

The apparatus of FIG. 8 is intended for insertion as a probe within a tube or pipe and the transducer assembly functions as in the pellet scanning embodiment with the exception that the assembly is now within the member to be scanned. The assembly is located centrally and co-axially within a tube or pipe by means of the members 68 and 74 which are continually urged into engagement with the wall of the tube or pipe by the springs 72 and 78. The members 68 and 74 centre the transducer assembly within the pipe or tube and also allow the assembly to be moved axially along the bore of the pipe or tube. The members 68 and 74 are formed from a material which is capable of sliding readily with little frictional resistance along the wall of the tube or pipe. A plastics material is suitable and nylon is one example.

I claim:

1. Apparatus for gauging physical dimensions of objects comprising a four arm electrical network, a capacitive transducer and a reference capacitor respectively forming two arms of the network, two charge amplifiers forming the other two arms of the network, means for applying an alternating current carrier input signal to the transducer and the reference capacitor, means for obtaining a signal dependent on the difference between the outputs of the charge amplifiers, means for demodulating the dependent signal to give an output representative of a change in a dimension of an object being gauged, the improvement wherein the transducer comprises a circular array of angularly spaced electrodes forming diametrically arranged pairs of capacitors, means for switching said pairs sequentially in the capacitive transducer arm of the network, means for positioning the transducer coaxially with the object for relative axial displacement therebetween, and means for effecting relative axial displacement therebetween whereby simultaneous application of the switching means and the displacement means results in a profiled scan of the object, said last mentioned means including means for positioning and moving objects through the transducer, said positioning and moving means comprising a pair of plungers adapted to releasably hold an object between the ends thereof.

2. Apparatus according to claim 1 in which at least one of the plungers additionally constitutes a calibration standard.

3. Apparatus for gauging physical dimensions of objects comprising a four arm electrical network, a capacitive transducer and a reference capacitor respectively forming two arms of the network, two charge amplifiers forming the other two arms of the network, means for applying an alternating current carrier input signal to the transducer and the reference capacitor, means for obtaining a signal dependent on the difference between the outputs of the charge amplifiers, means for demodulating the dependent signal to give an output representative of a change in a dimension of an object being gauged, the improvement wherein the transducer comprises a circular array of angularly spaced electrodes forming diametrically arranged pairs of capacitors, means for switching said pairs sequentially in the capacitive transducer arm of the network, means for positioning the transducer coaxially with the object for relative axial displacement therebetween, and means for effecting relative axial displacement therebetween whereby simultaneous application of the switching means and the displacement means results in a profiled scan of the object, said transducer comprising a probe insertable within a bore of a tube and having means for centering the transducer within the bore, said centering means comprising lantern shaped members resiliently urged radially outwards to maintain sliding engagement with the bore of the tube.

* * * * *